(12) United States Patent
Reed et al.

(10) Patent No.: US 9,928,570 B2
(45) Date of Patent: Mar. 27, 2018

(54) METHOD AND APPARATUS FOR PRECISION MEASUREMENTS ON A TOUCH SCREEN

(71) Applicant: Calgary Scientific Inc., Calgary (CA)

(72) Inventors: Kenneth Todd Reed, Calgary (CA); Jonathan Neil Draper, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 0 days.

(21) Appl. No.: 14/554,549

(22) Filed: Nov. 26, 2014

(65) Prior Publication Data

US 2016/0098818 A1 Apr. 7, 2016

Related U.S. Application Data

(60) Provisional application No. 62/058,298, filed on Oct. 1, 2014.

(51) Int. Cl.
G06T 3/40 (2006.01)
G06F 3/041 (2006.01)
G06F 3/0488 (2013.01)
G06F 3/0484 (2013.01)

(52) U.S. Cl.
CPC ............. *G06T 3/40* (2013.01); *G06F 3/041* (2013.01); *G06F 3/0488* (2013.01); *G06F 3/04842* (2013.01); *G06F 3/04845* (2013.01)

(58) Field of Classification Search
None
See application file for complete search history.

(56) References Cited

U.S. PATENT DOCUMENTS

| 7,746,360 | B2 | 6/2010 | Ubillis et al. | |
| 7,889,212 | B2 | 2/2011 | Schulz et al. | |
| 8,522,158 | B2 | 8/2013 | Beck et al. | |
| 8,543,415 | B2 | 9/2013 | Venon | |
| 2002/0149628 | A1* | 10/2002 | Smith | G06F 3/04815 715/848 |
| 2009/0021475 | A1 | 1/2009 | Steinle et al. | |
| 2010/0235770 | A1* | 9/2010 | Ording | G06F 1/1626 715/765 |

(Continued)

FOREIGN PATENT DOCUMENTS

| CA | 2779590 | 12/2012 |
| EP | 2017756 | 1/2009 |

(Continued)

*Primary Examiner* — Kenneth Bukowski
(74) *Attorney, Agent, or Firm* — Meunier Carlin & Curfman LLC

(57) ABSTRACT

A measurement method and apparatus to make precise measurements on a touch screen device, such as a mobile device. A measuring tool is provided that that measures a quantity associated with an image being displayed on the touch screen. In response to a user selection, the measuring tool may be activated. A magnified view is presented that shows a position associated with a touch of, e.g., a user's finger so the user may fine-tune a start position of a measurement. The user's touch may be tracked from the start position to a current position during which time a dynamically updated display of the quantity being measured is presented. An ending measurement of the quantity is displayed in accordance with a removal of the touch at an end position.

11 Claims, 16 Drawing Sheets

(56) References Cited

U.S. PATENT DOCUMENTS

| | | | |
|---|---|---|---|
| 2011/0096087 A1 | 4/2011 | Chun | |
| 2012/0262484 A1* | 10/2012 | Gottfeld | G09B 5/065 |
| | | | 345/632 |
| 2013/0174077 A1* | 7/2013 | Asami | A61B 5/7435 |
| | | | 715/771 |
| 2013/0332892 A1 | 12/2013 | Matsuki | |
| 2014/0026097 A1* | 1/2014 | Crohas | G06F 3/04883 |
| | | | 715/810 |

FOREIGN PATENT DOCUMENTS

| | | |
|---|---|---|
| EP | 2674845 | 12/2013 |
| WO | 2013/165306 | 11/2013 |

\* cited by examiner

1600

METHOD AND APPARATUS FOR PRECISION MEASUREMENTS ON A TOUCH SCREEN

CROSS-REFERENCE TO RELATED APPLICATION

This application claims priority to U.S. Provisional Patent Application No. 62/058,298, filed Oct. 1, 2014, entitled "Method and Apparatus for Precision Measurements on a Touch Screen," which is incorporated herein by reference in its entirety.

BACKGROUND

Many computer devices operate by touch screen interaction. In methods for making measurements of an image on a touch screen that reply on placement at a location of interest, it can be difficult to provide precise touch placement. This is due to the size and nature of a users' touch as compared to a mouse or other virtual pointer, especially for relatively small screens as may be found on a mobile device.

SUMMARY

Disclosed herein are examples of a measurement method and apparatus that may be used to make precise measurements on a touch screen device, such as a mobile device. In accordance with aspects of the disclosure, the method may include displaying an image on a display associated with a client computing device; providing a measuring tool that measures a quantity associated with the image being displayed; activating the measuring tool in response to a received selection; displaying a magnified view of a start position associated with a touch; tracking a movement of the touch from the a start position to a current position of the touch, the tracking including presenting a dynamically updated display of the quantity in accordance with the movement; and displaying an ending measurement of quantity in accordance with a removal of the touch at an end position.

In accordance with other aspects of the disclosure, a method is disclosed that includes providing a measurement tool in a client-server architecture, the measurement tool for measuring a quantity associated with a displayed image and including a magnified view of the image; rendering the image and the magnified view at a server; communicating the image and the magnified to the client computing device; communicating metadata from the server to client computing device that contains information about the quantity; and rendering the dynamically updated display of the quantity at the client computing device using the metadata.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described with respect to a mobile device having a touch screen, it will become evident to those of ordinary skill in the art that the present disclosure is not limited to mobile devices, and may be implemented on other computing devices having a touch screen.

Overview

The present disclosure is directed to a method of implementing a measurement tool that is activatable by user touch screen interaction to make precision measurements of an image that is displayed on a, e.g., mobile device having a touch screen. The measurements include, but are not limited to, measuring a linear distance, area of a region of interest, and a point of interest. To aid a user's measurement, a magnified view is displayed such that the user may precisely set a start point of the measurement. Once the start point is set, the user's touch movement is tracked and a current measured quantity is dynamically updated and displayed on the touch screen. For example, if the user is measuring a linear distance, a line segment may be displayed that extends from the start point to the current detected touch position on the display together with the dynamically updated linear measurement. As another example, if the user is measuring a region of interest, a geometric shape (a circle, oval, rectangle, etc.) may be displayed having a center point, vertex or corner at the start point. The geometric shape may expand (or contract) in response to the detected touch movement together with a dynamically updated area measurement. A detected lift of the touch sets the end point of the measurement. Once the lift is detected, a final measurement is displayed to the user that indicates, e.g., the linear distance from the start point to the end point or an area of a region of interest based on the size of geometric shape. In accordance with aspects of the disclosure, a user may resize the line segment or geometric shape by "grabbing" a portion of the line segment or geometric shape and moving it to a new position on the touch screen. Like above, the current measured quantity is updated in near-real time and displayed to on the touch screen.

Example Operational Flow, Timing Diagrams and User Interfaces

Figure 1:
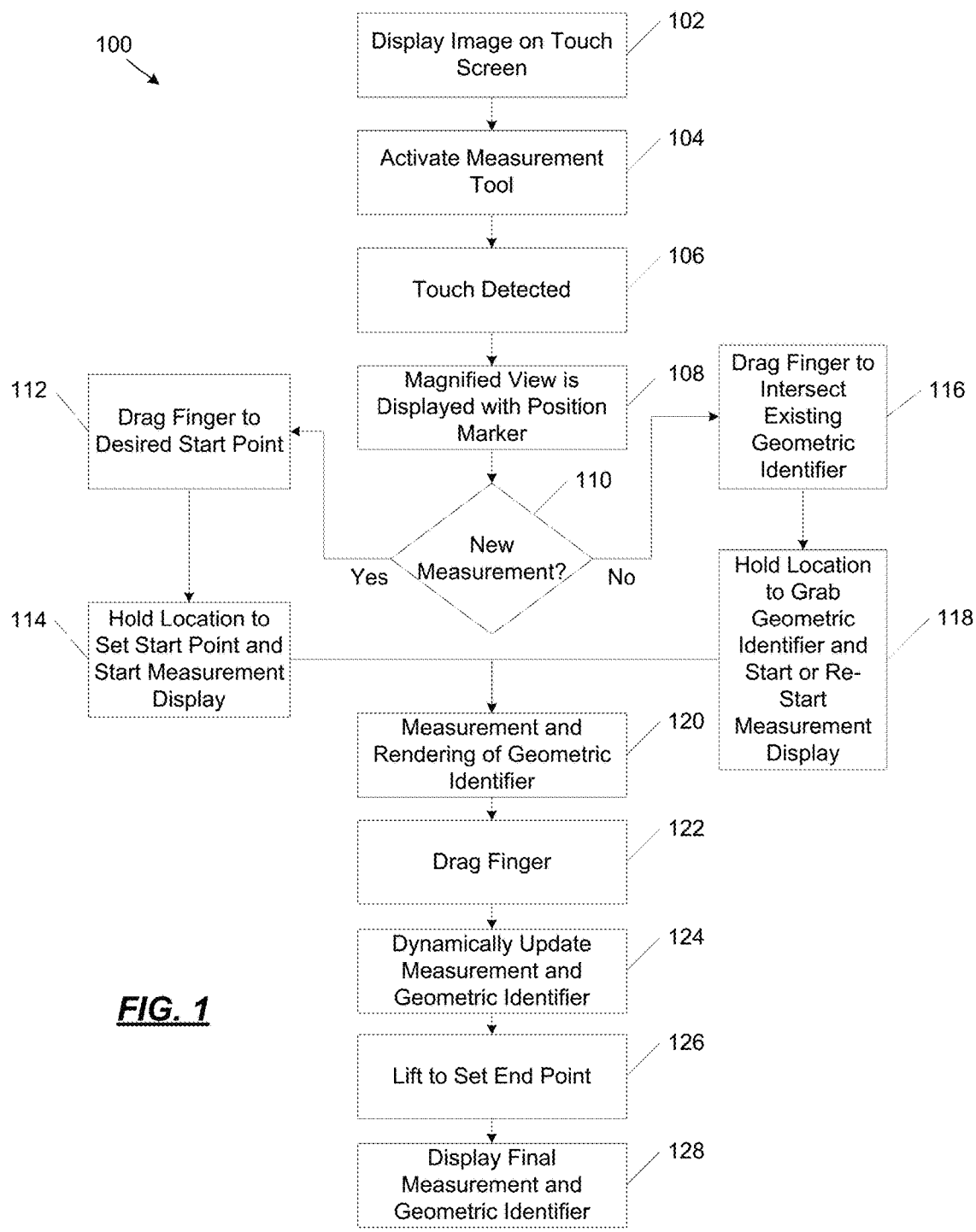
FIG. 1 is an example generic operational flow in accordance with the present disclosure.
Figure 2:
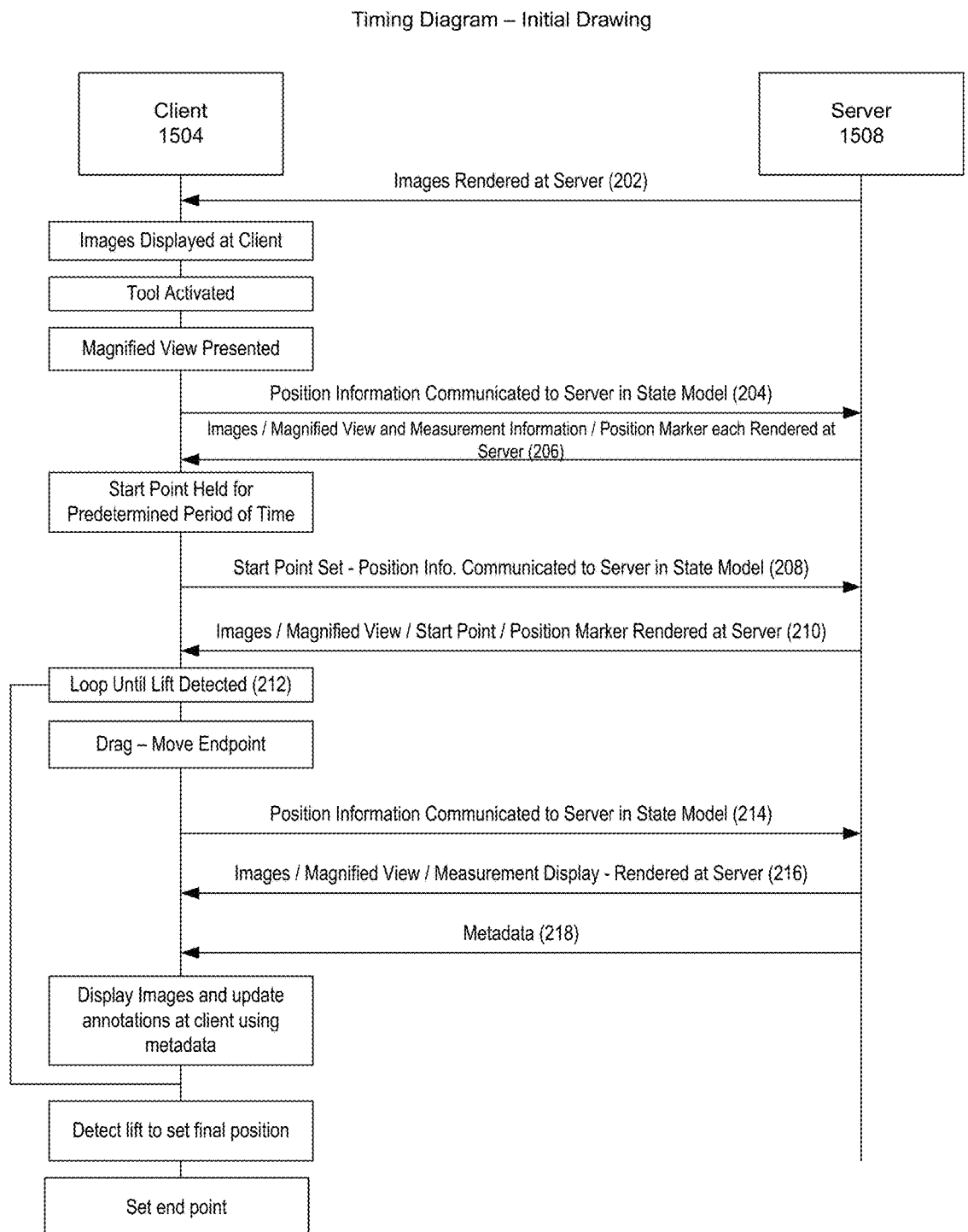
FIG. 2 an example timing diagram showing data flows between a client (e.g., a mobile device) and a server implementing aspects of the operational flow of FIG. 1.
Figure 3:
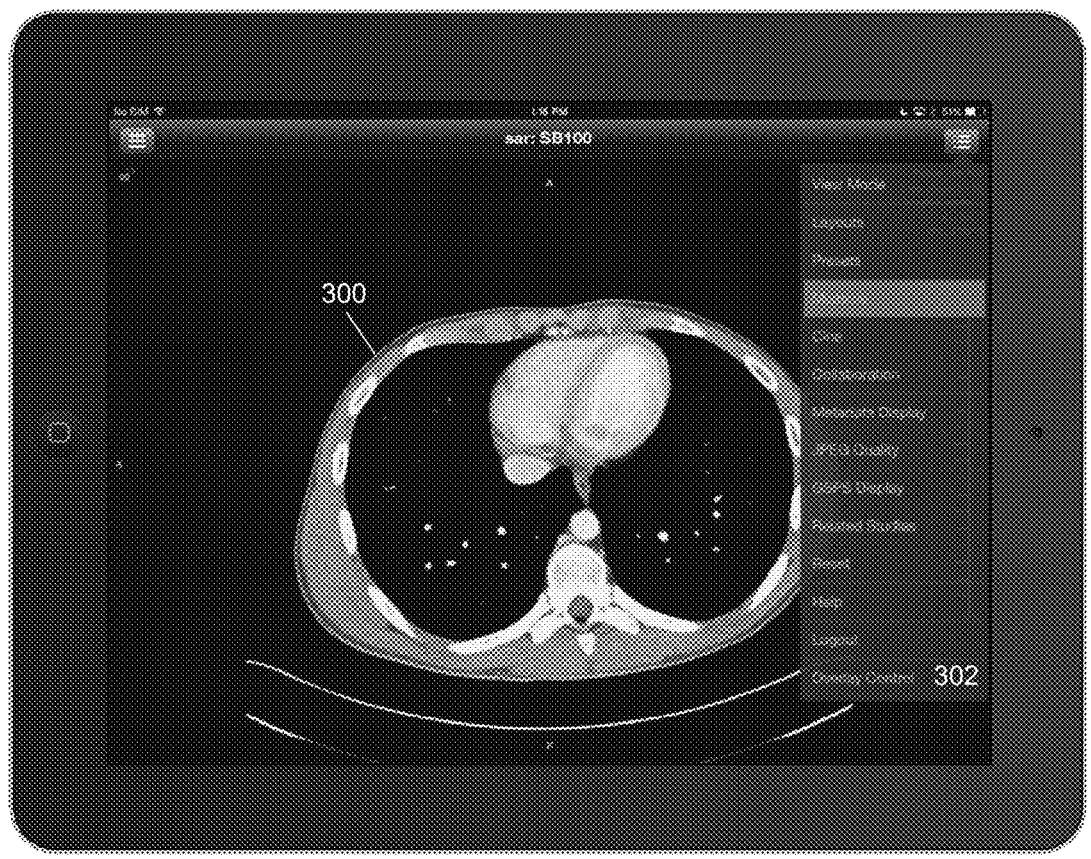
FIG. 3 is an example medical diagnostic image and example menu that may be displayed on a touch screen of the mobile device, the menu including a measurement tool option.

FIG. 1 is an example generic operational flow 100 in accordance with the present disclosure. FIG. 2 an example timing diagram showing data flows between a client 1504, such as a mobile device, and a server 1508 implementing aspects of the operational flow 100. A more detailed discussion of the environment in which the operational flow 100 may be implemented in described below with reference to FIG. 15. At 102, an image is displayed on a touch screen. Initially, a user at the client 1504 (encompassing any of client computing devices exemplified at 1504A-1504D in FIG. 15 may connect to the server 1508 to view images on, e.g., a touch screen. The server 1508 renders the images to be viewed and communicates the rendered images to the client 1504 over, e.g., a network connection (data flow 202). For example, as shown in FIG. 3, the image 300 may be, but is not limited to, a medical diagnostic image, CAD images, seismic images or other images, such as high resolution images.

Figure 4:
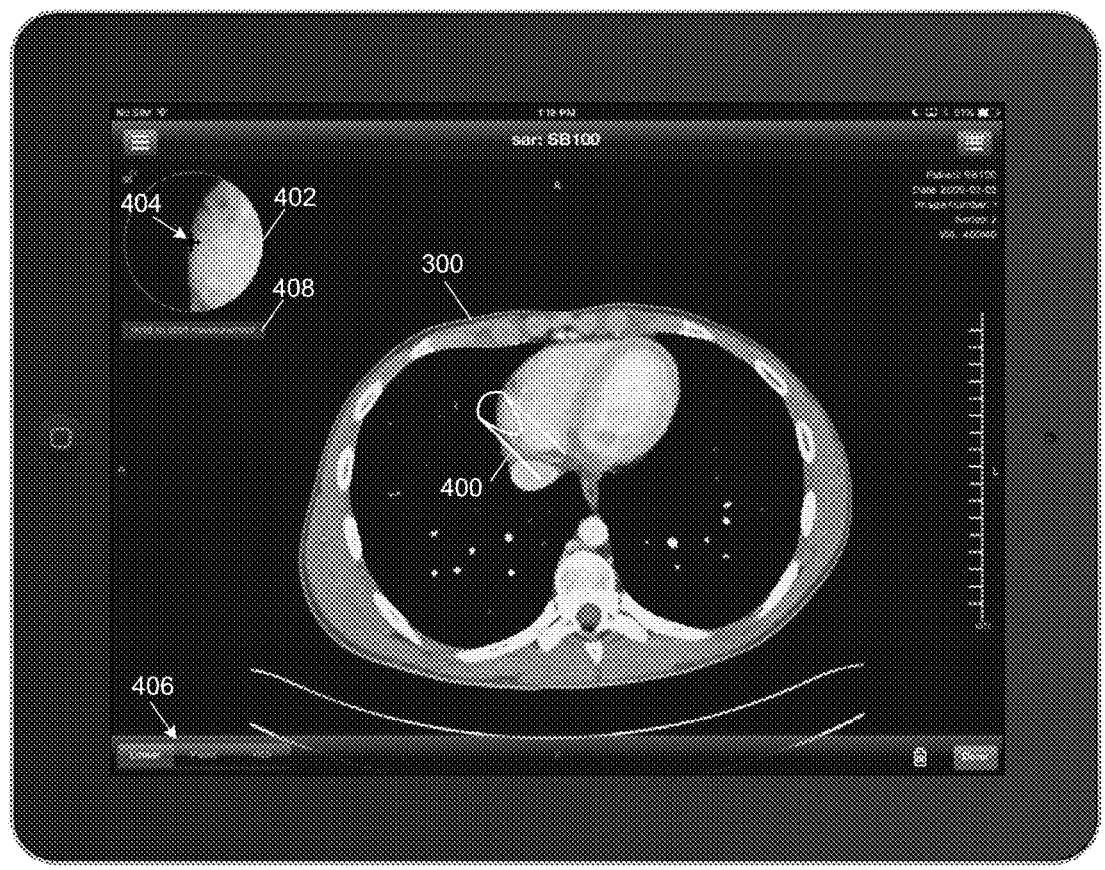
FIG. 4 is another view of the example medical diagnostic image of FIG. 3, magnified view and menu of measuring tools that may be displayed on the touch screen of the mobile device.

At 104, a measurement tool, such as that described above is activated. As shown in FIG. 3, activation of the measurement tool may be selected from a menu 302 of options that is presented to a user. At 106, a touch of the image 300 (or elsewhere on touch screen) is detected. For example, as shown in FIG. 4 a user may activate a linear measurement from a submenu 406 and may place his or her finger 400 on an area of the touch screen. Alternatively, a stylus or other pointing device may be used instead of the user's finger 400. As will be described, the user's finger 400 or stylus may be used to point and/or drag geometric identifiers within the image 300 to effectuate the measurement operations described below. As shown in FIG. 4, a magnified view 402 may be displayed in, e.g. a top left corner (or other location) of the touch screen. An informational message 408 may be presented to the user indicating next steps in the process. Position information associated with the position of the detected touch is communicated from client 1504 to the server 1508 (data flow 204). The position information may be communicated in a state model that contains application state information. Details of the state model are described below. Additionally or optionally, a position marker 404 may be provided to show a precise location of the user's touch point on the touch screen. For example, the marker may be provided as a red crosshair (or other color or object) in the magnifying glass to show the touch position and allows the user to fine-tune a start point of the measurement. The images for display on the touch screen, the magnified view and the marker are rendered at the server 1508 and communicated to the client 1504 for display (data flow 206).

Figure 5:
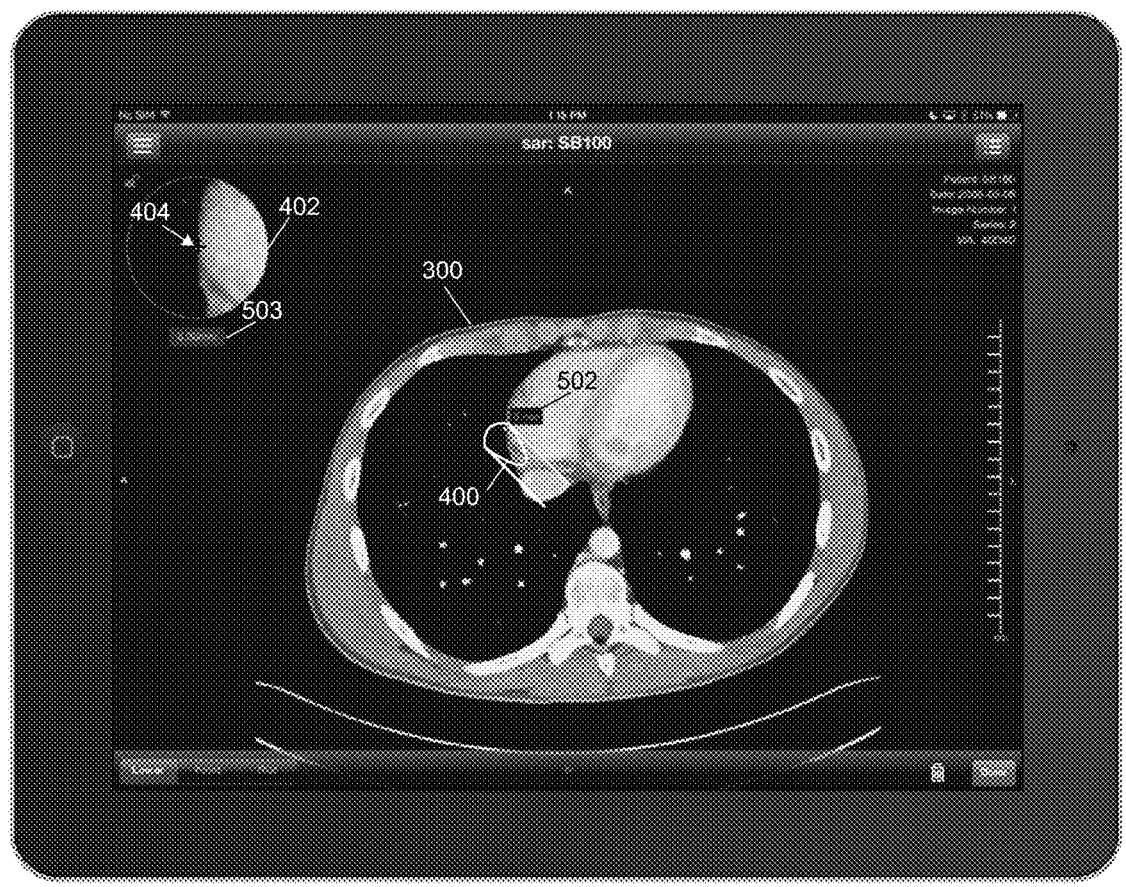
FIG. 5 is another view of the example medical diagnostic image of FIG. 3 on the touch screen of the mobile device.

At 110, it is determined if the measurement to made is a new measurement. If it is determined this is a new measurement, then at 112, the user may fine-tune the start point by dragging his or her finger on the touch screen. At 114, once the user has fine-tuned the start point, user then holds his or her finger to set the start point in order to begin a measurement. As shown in FIG. 5, in accordance with exemplary aspects of the present disclosure, after a predetermined period of time, e.g. 0.5 seconds, the red crosshair turns green in order to indicate that the start point has been set. In accordance with the present disclosure, the position marker may be any color or object that provides sufficient contrast or shape such that it is visible on the displayed image 300. The identifier may also change in color, size or other manner to indicate that the start point has been set.

At 120, the measurement operation begins and rendering starts. Position information is communicated from the client 1504 to the server 1508 in the state model (data flow 208). Images 300 for display on the touch screen, the magnified view 402 and the position marker 404 are rendered at the server 1508 and communicated to the client 1504 for display (data flow 210). This begins a loop 212 of data flows 214, 216 and 218, as shown in FIG. 2. With reference to FIG. 5, when the measurement operation begins a dynamic update operation for substantially real-time measurement displays 502 and 503 of the distance measured is provided to the user. Initially, the distance is 0 mm, as shown (FIG. 5).

At 122, the user drags his or her finger (or the pointing device) across the touch screen to make the measurement, and at 124 the measurement displays 502 and 503 are dynamically updated by client-side rendering using metadata communicated by the server to indicate the distance the user has dragged his or her finger. For example, the measurement displays 502 and 503 may contain annotations derived from the metadata that include, but are not limited to, measurement information such as a current position, length, area, volume, etc., related to an operation being performed. The metadata may be used to indicate other features of the image in addition to measurement information. During the dragging, the position information is communicated from the client 1504 to the server 1508 in the state model (data flow 214). Images 300 for display on the touch screen, the magnified view 402 and the position marker 404 are rendered at the server 1508 and communicated to the client 1504 with the metadata (data flow 216). Metadata is communicated in dataflow 218 to be used to provide annotations.

Figure 6:
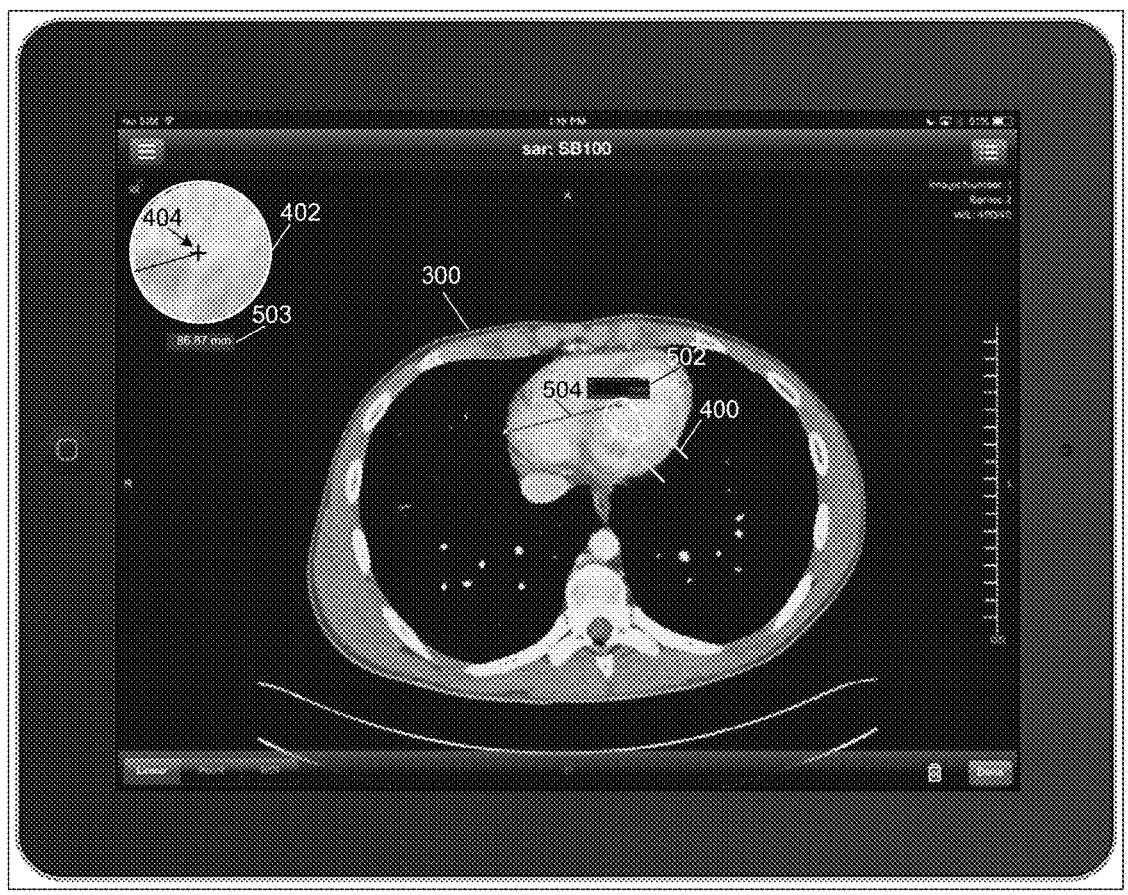
FIG. 6 is yet another view of the example medical diagnostic image of FIG. 3 on the touch screen of the mobile device.
Figure 7:
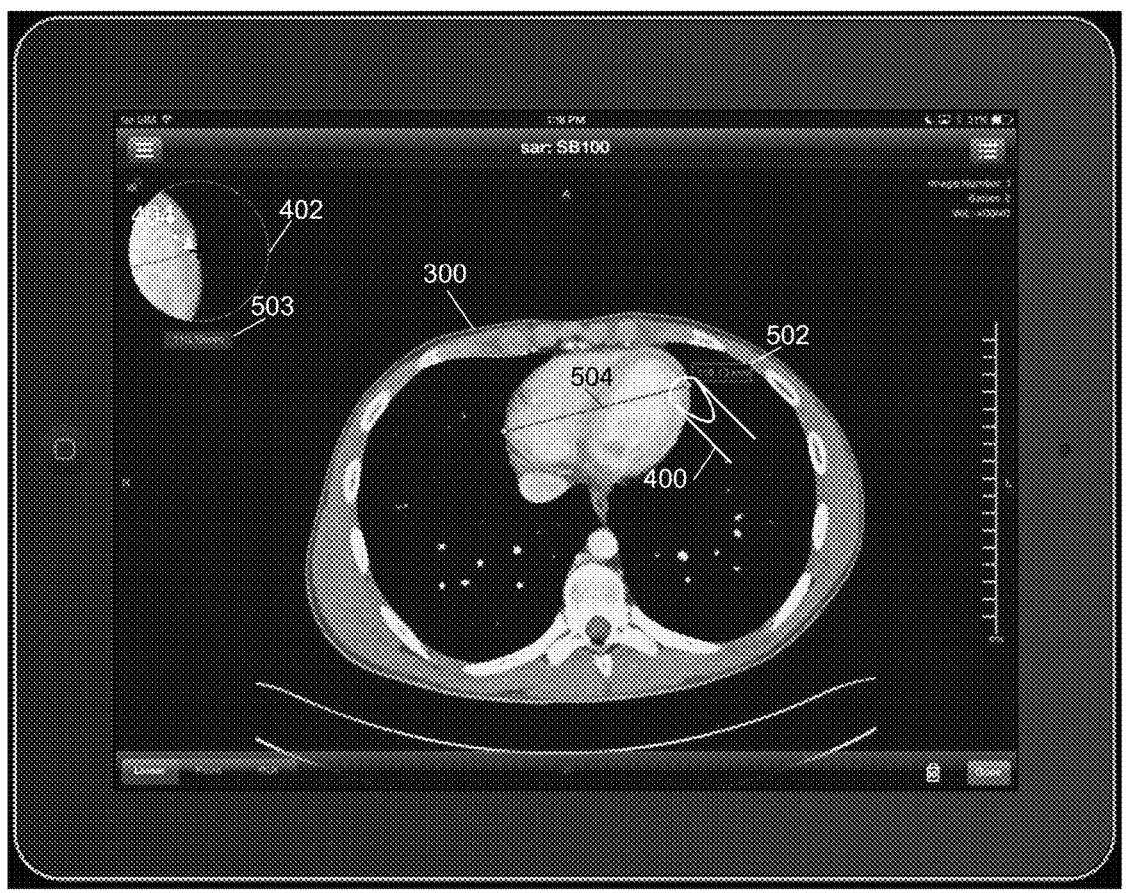
FIG. 7 shows a view of an example a linear measurement in-progress as a user drags his or her finger a distance across the example medical diagnostic image of FIG. 3.
Figure 8:
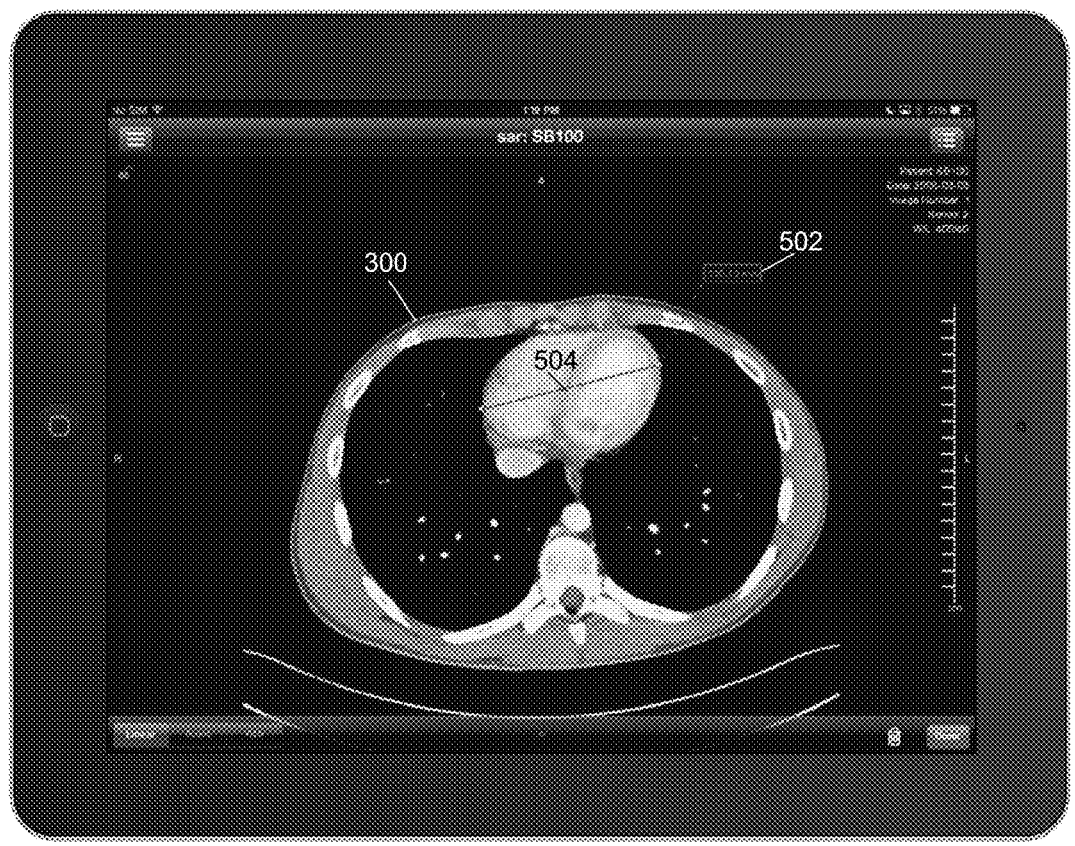
FIG. 8 shows a view of a completed measurement of a portion of the example medical diagnostic image of FIG. 3.

For example, as shown in FIG. 6, the user's finger 400 has moved from the start point to an intermediate location in the image 300. Accordingly, the real-time measurement displays 502 and 503 indicate the distance from start point to current position of the user's finger 400 (e.g., 86.87 mm). A line segment 504 may be presented to visually indicate the distance as a one-dimensional geometric identifier. Subsequently, as shown in FIG. 7, the user has dragged his or her finger 400 a further distance across the diagnostic image and measurement displays 502 and 503 indicate that the distance from the start point to the detected touch current position is e.g. 110.13 mm. At 126, the user lifts his or her finger to set the end point of the measurement. At 128 the final measurement is displayed to the user. As shown in FIG. 8, the user's finger is removed from the display and the measurement display 502 shown indicates that the distance from the start point to the end point of the line segment 504 is 110.13 mm.

Also, once the user's finger is removed, the magnified view may also be removed from the display.

Figure 9:
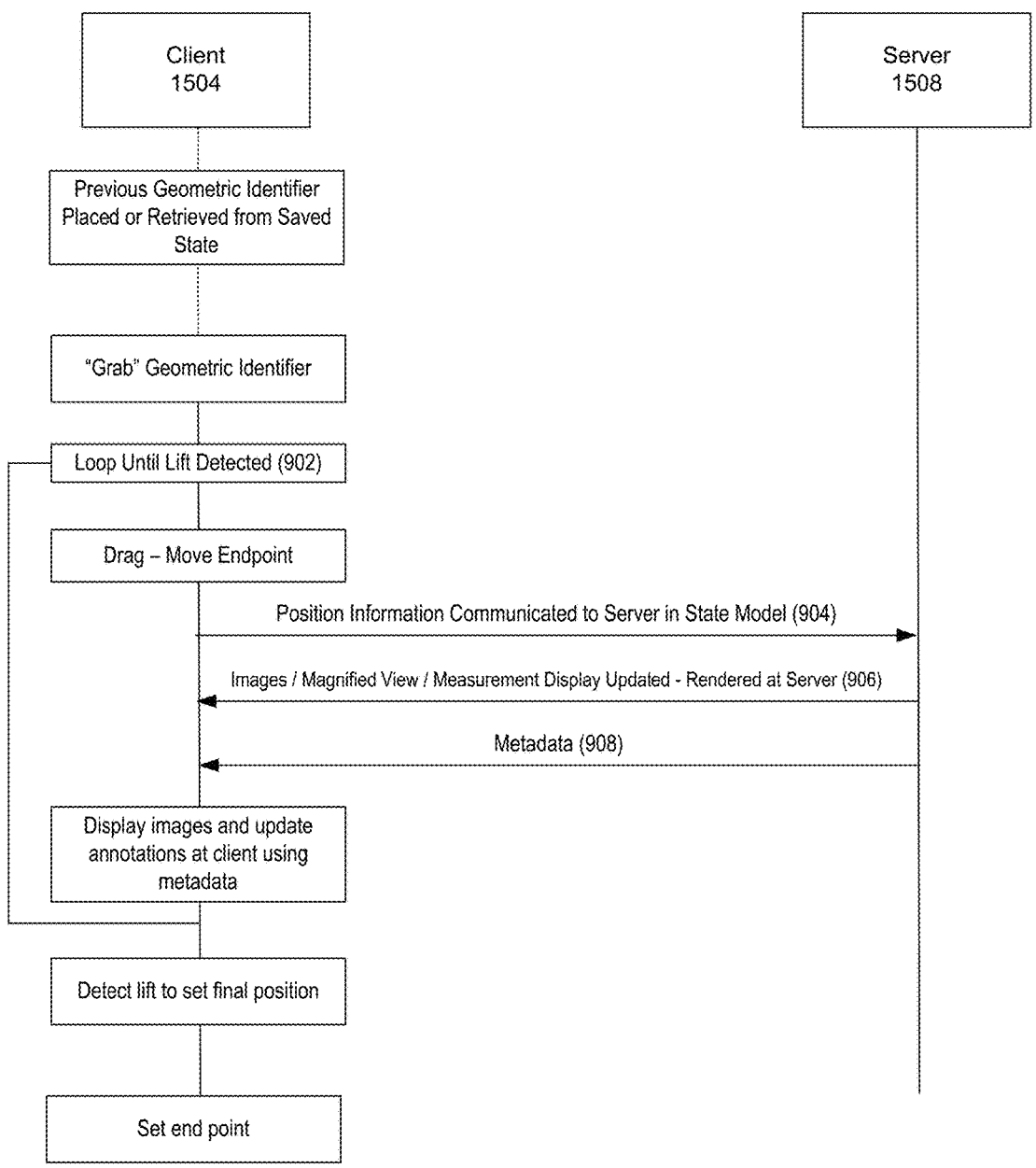
FIG. 9 is another example timing diagram that shows data flows between the client and the server in accordance with aspects of the operation flow of FIG. 1.
Figure 10:
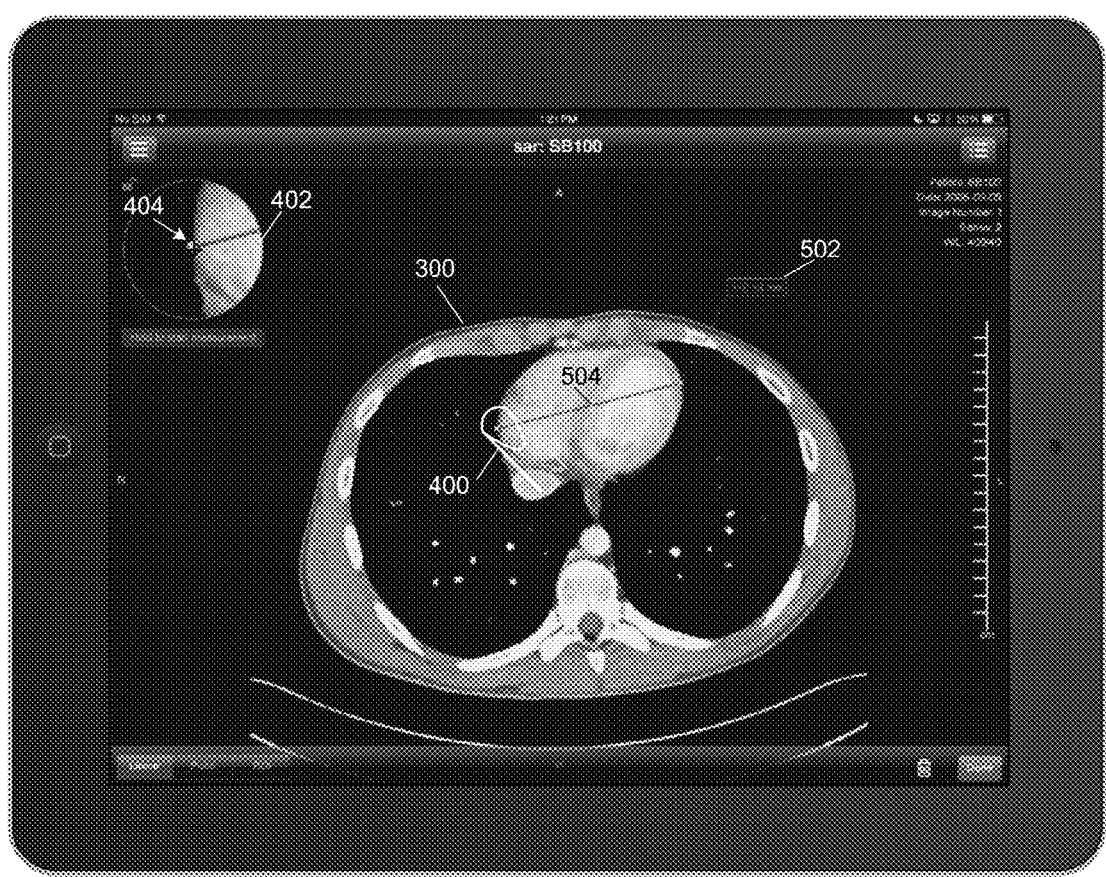
FIG. 10 shows an example medical diagnostic image and a user's finger that has touched a location on an existing measurement line.
Figure 11:
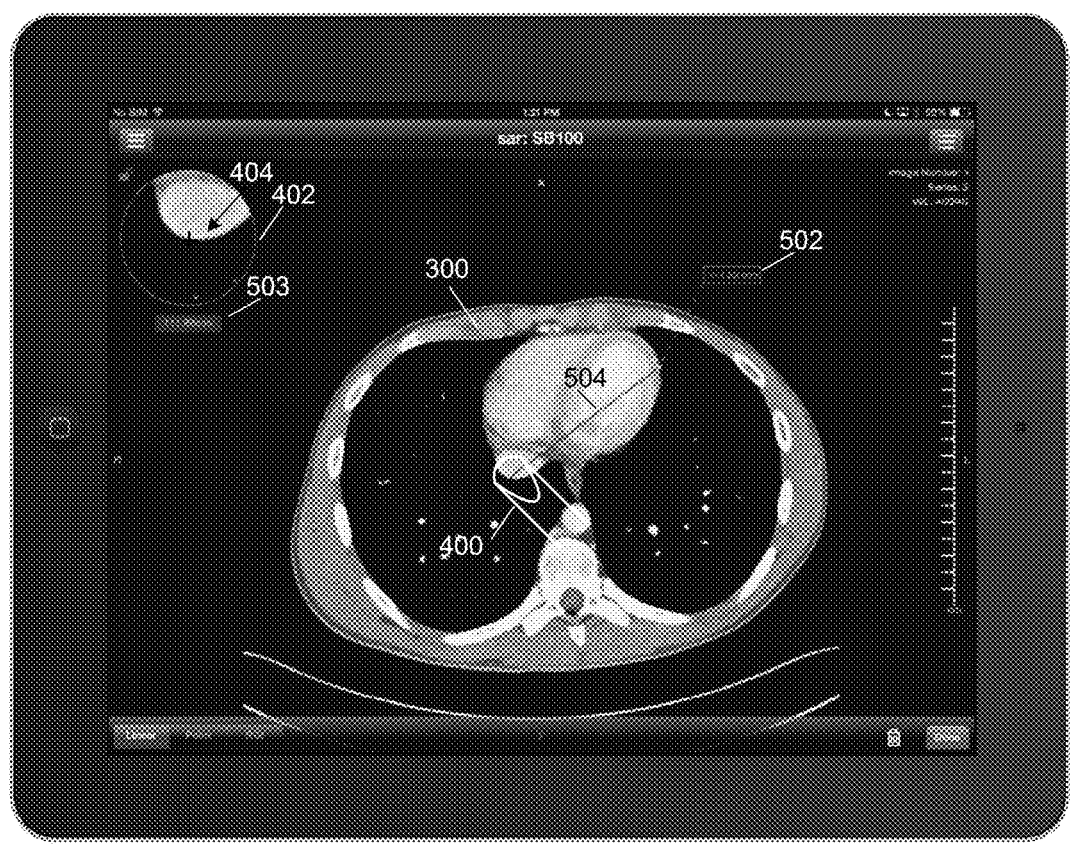
FIG. 11 shows a resizing/movement of a measurement of the example medical diagnostic image of FIG. 3.

If, at 110, it is determined that this is not a new measurement, then the operational flow continues in accordance with the example timing diagram of FIG. 9 that shows data flows between the client 1504 and the server 1508. At 110, the data flows 202-206 have already taken place in accordance with operations 102-108, as described above. As such, a previous geometric identifier has already been placed in the images 300 or has been retrieved from saved state information. In accordance with the present disclosure, the application state information may be saved and retrieved at a later time. Initially, when a user places his or her finger 400 on the touch screen display, the indication marker 404 in the magnified view 402 may be a red crosshair (e.g., similar to that shown in FIG. 4). At 116, the user drags his or her finger 400 (or other pointing device) to intersect an existing line segment 504. Once the user's finger 400 intersects the geometric identifier, the indication marker 404 in the magnified view 504 may change to a yellow crosshair (or other color or object), as shown in FIG. 10. At 118, the user holds the position (grabs) to set a start point of the existing measurement to start (or restart) the measurement displays. After the start point is set, the indication marker 404 may change to a green crosshair (or other color or object), as shown in FIG. 11.

The operational flow then continues at 120, where the measurement operation begins. This begins a loop 902 of data flows 904, 906 and 908, as shown in FIG. 9. As shown in FIG. 11, the user may drag his or her finger 400 (at 122) to resize the line segment 504 to update an existing measurement. At 124, the measurement displays 502 and 503 are dynamically updated using the metadata to indicate the current length of the line segment 504. The line segment 504 may pivot about either the start point or the end point and the display measurement 502 reflects the resized line. During the dragging, the position information is communicated from the client 1504 to the server 1508 in the state model (data flow 904). Images for display on the touch screen, the magnified view and the marker are rendered at the server 1508 and communicated with the metadata to the client 1504 for display (data flow 906). Metadata to be used as annotations is communicated at 908. As noted above, the annotations may be measurement information displayed in the measurement displays 502 and 503. At 126, the user lifts his or her finger 400 to set the line segment 504 at its new size. For example, as shown in FIG. 11, the measurement is, e.g. 111.89 mm. At 128, the final measurement is displayed to the user in the display measurement 502. Although not shown in the FIGS. similar to a new measurement, when the user lifts his or her finger to stop the measurement, the magnified view may be removed from the display.

Figure 12:
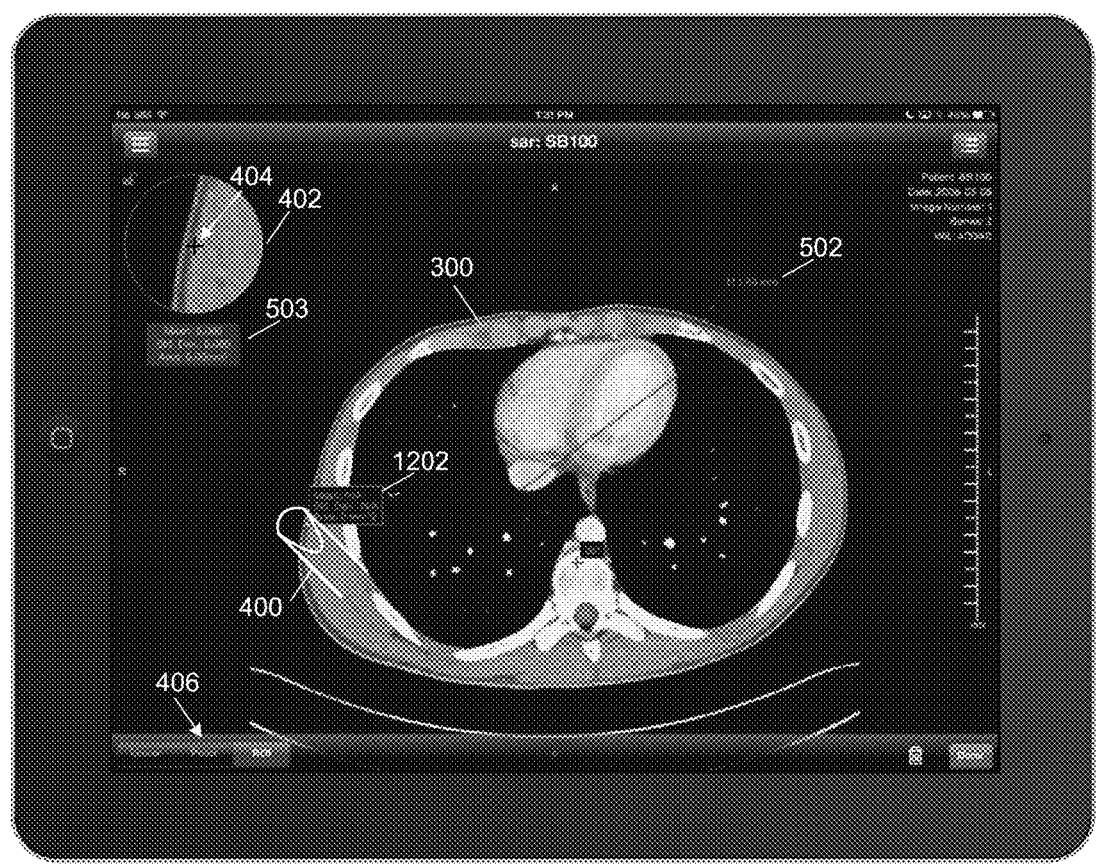
FIG. 12 shows an example a region of interest measurement of the example medical diagnostic image of FIG. 3.
Figure 13:
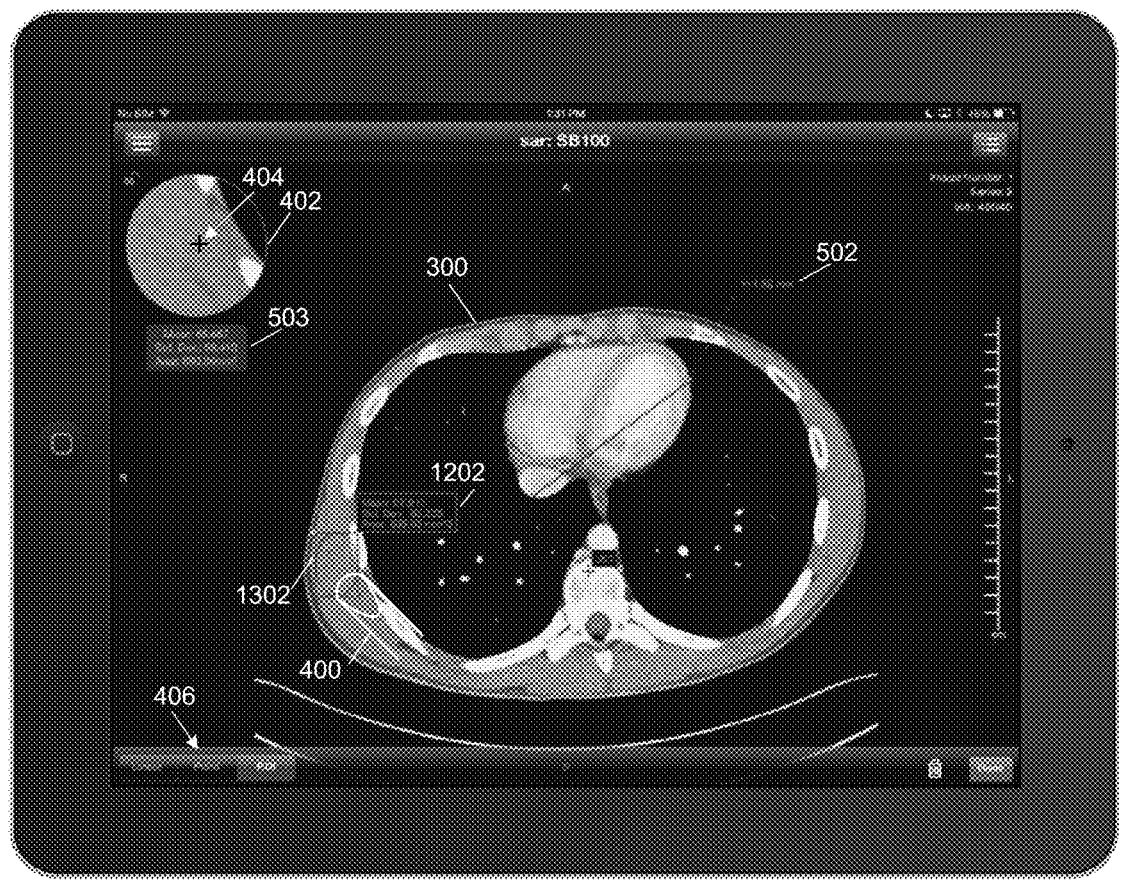
FIG. 13 illustrates an in-progress region of interest measurement as a user drags his or her finger.

In accordance with other aspects of the present disclosure, the measurement to be made may be a region of interest, e.g., area or a two-dimensional measurement. For example, with reference to FIGS. 1, 12 and 13, the user may activate the measurement operation at 104 and select the region of interest (ROI) tool from the submenu 406. At 106, when the user's touch of the image (or elsewhere on the touch screen) is detected, the magnified view 402 is displayed in, e.g., the top left corner at 108. A determination of 110 may be made if this is a new measurement, and if so, at 112 the user may fine-tune the start point by dragging his or her finger 400 on the touch screen. At 114, once the user has fine-tuned the start point, user then holds the position to begin the measurement, as described above. At 120, the measurement operation begins. With reference to FIG. 12, when the measurement operation begins, a substantially real-time measurement display 1202 of the area of the region of interest is provided to the user using the metadata provided by the server, as described above (see also FIG. 13). At 122, the user drags his or her finger 400 across the touch screen to expand or contract the geometric identifier, in this case a two-dimensional object, 1302 in response to the detected touch movement. As noted above, the geometric identifier 1302 may be a circle, oval, rectangle (or other two-dimensional object). At 124, the display measurement 1202 is dynamically updated to indicate the area within the geometric shape 1302. At 126, the user lifts his or her finger 400 to set the size of the geometric shape 1302 indicating the region of interest. At 128, the final measurement is displayed to the user. Although not shown in FIG. 13, once the user's finger is removed, the magnified view is removed from the display.

If, at 110, it is determined that this is not a new measurement, then at 116, the user drags his or her finger to intersect an existing portion of the geometric shape indicating the region of interest. At 118, the user holds the position to grab the geometric shape and measurement displays are started (or restarted if the geometric shape is retrieved from a saved state). The operational flow then continues at 120-128 as described above. In accordance with this aspect of the present disclosure, the geometric identifier indicating the region of interest may be resized. Once the user has lifted his or her finger to end the resizing operation, the magnified view may be removed and the final area of the region of interest is displayed to the user.

Figure 14:
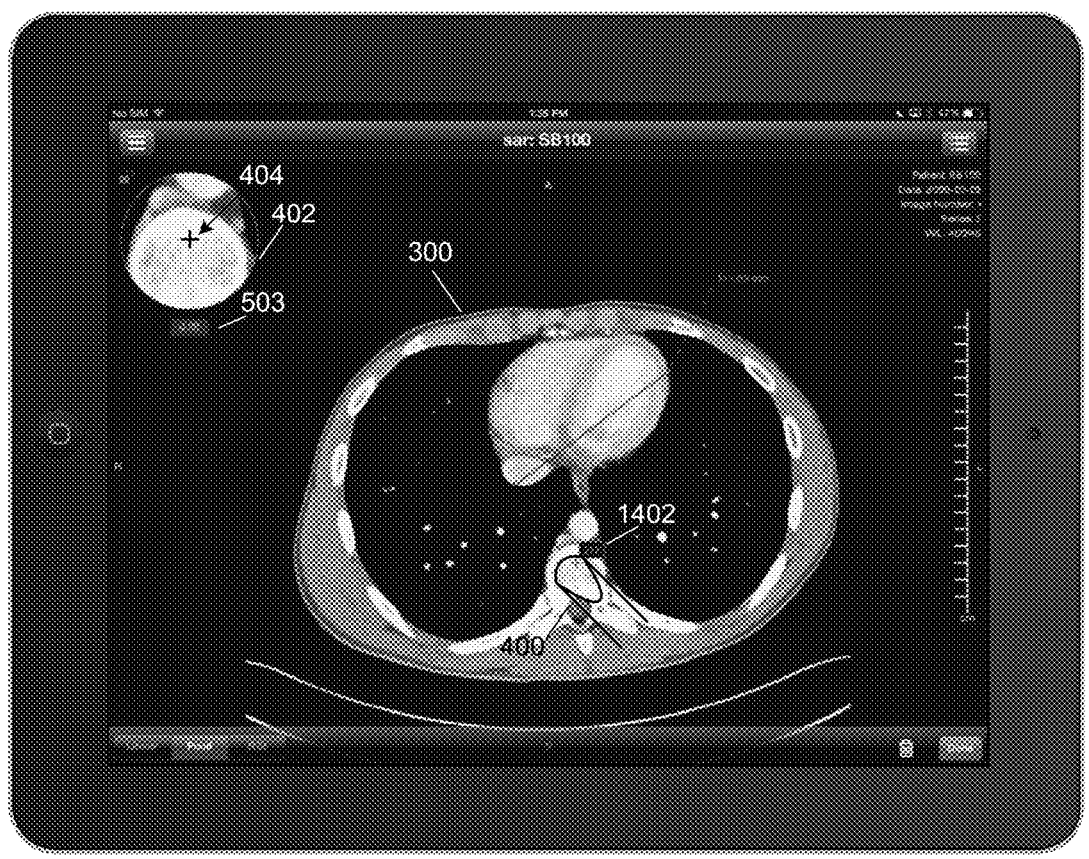
FIG. 14 shows an example point measurement of the example medical diagnostic image of FIG. 3.

FIG. 14 shows an example point measurement of the example medical diagnostic image of FIG. 3. In accordance with the present disclosure, a point measurement may be made to determine characteristics of the displayed image 300 at a particular position. For example, the point measurement may be made to determine bone density. To convey the measure characteristic to the user, a measurement display 1402 may be presented. As shown in FIG. 14, the bone density is 217 Hounsfield Units. Point measurements may be made for any characteristic associated with the displayed image 300 as made available by the metadata associated with the image 300.

Example Environments

Figure 15:
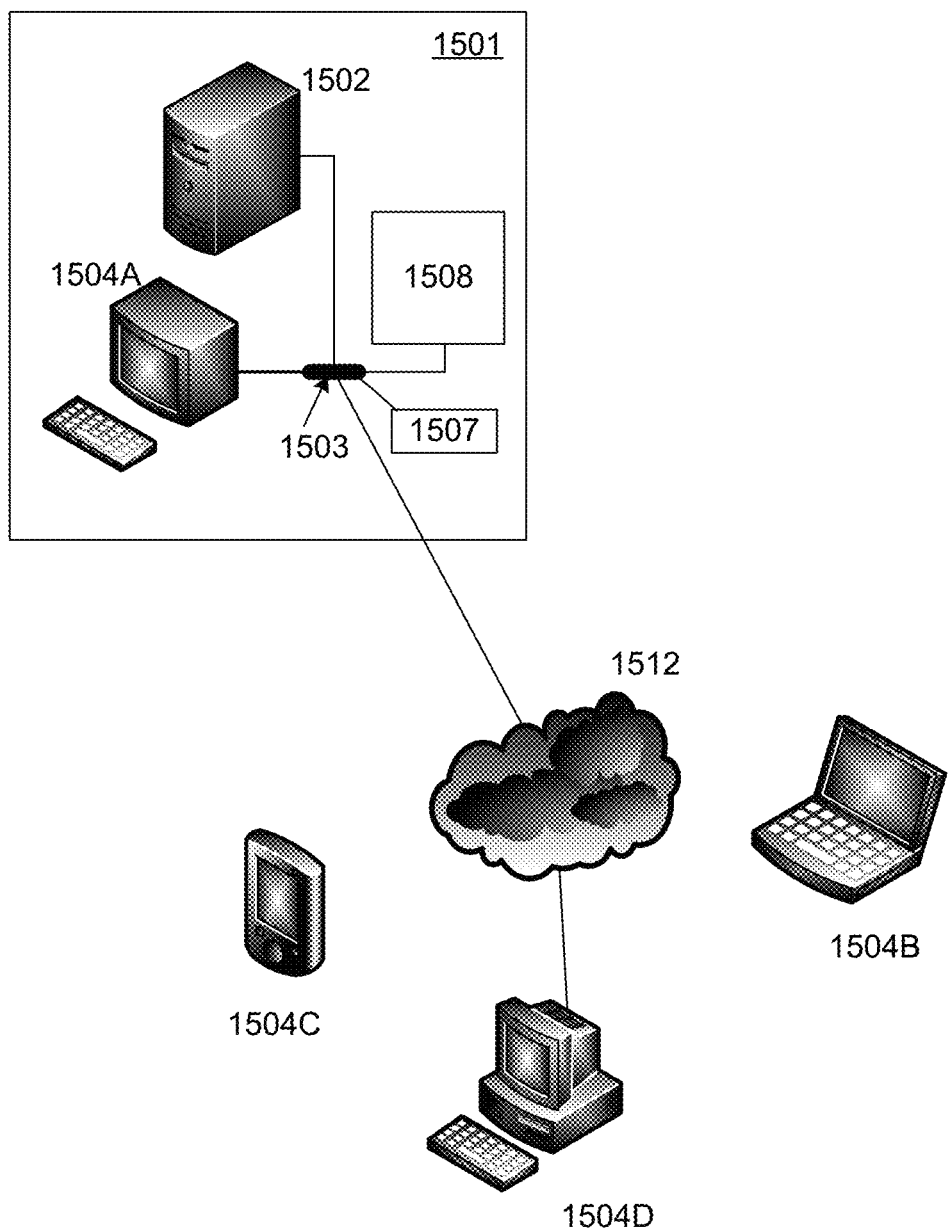
FIG. 15 is high level exemplary environment in which aspects of the present disclosure may be implemented.

FIG. 15 is high level exemplary environment 1500 in which aspects of the present disclosure may be implemented. The environment 1500 of FIG. 15 includes a facility 1501, which may be hospital, medical clinic, doctor's office, surgery center, etc. The facility 1501 may include a Picture Archiving and Communication Systems (PACS) database 1502, a client computing device 1504A, a scanner 1507, and an imaging server computer 1508 that are each connected to a local LAN 1503. The imaging server 1508 may be RESOLUTIONMD available from Calgary Scientific, Inc., of Calgary, Alberta, Canada. The imaging server computer 1508 may be used to connect the client computing device 1504A to applications provided within the facility 1501, such as a medical imaging application. The PACS database 1502 may be associated with a modality, such as a sonographic scanner, a CT scanner, and an MRI scanner (shown generally as scanner 1507). Typically, each modality is associated with its own PACS database.

The LAN 1503 may be connected to a wide area network 1512, such as the Internet. Other devices, such as client computing devices 1504B, 1504C and 1504D may be connected to the network 1512 to provide for communication between any of the devices in the environment 1500. The client computing devices 1504B, 1504C and 1504D may be mobile devices, smart phones, tablets, desktop computers, notebook computers, etc.

The imaging server 1508 may also provide a server remote access application to enable remote access to the PACS database 1502 by the client computing devices 1504B-1504D. The client computing devices 1504A-1504D may communicate with the PACS database 1502 imaging server computer 1508, and the scanner 1507 by entering, e.g., a Uniform Resource Locator (URL) within a browser or other client interface/application to connect to the imaging server. An example of the server remote access application is PUREWEB, available from Calgary Scientific, Alberta, Canada. The server remote access application utilizes the state model, discussed above, which is an association of logical elements of the application program with corresponding states of the application program. The state model enables the client computing devices 1504B-1504D to communicate user interactions, metadata, etc. to the imaging server 1508 and vice-versa to natively display the logical elements and resulting graphics on the client computing devices 1504B-1504D. The state model may contain session information about the application itself, information about displayed views, and information about how to tie a functionality of the application to the specific views (e.g., the measuring tools of the present disclosure).

In operation, the client computing devices 1504A-1504D may communicate with the imaging server computer 1508 to request and receive image data by contacting imaging server computer using an appropriate URL. The URL may pass parameters to, e.g., the imaging server computer 1508, such as a study instance ID, a repository ID, a client ID, and configuration parameters in order to retrieve data responsive to a query. Image data may then be retrieved from the PACS database 1502 and communicated to the requesting client computing device 1504A-1504D, as discussed above.

While the environment 1500 has been described in the context of a medical facility, the environment 1500 may be any environment wherein image data is communicated from a server to a client computing device to provide remote interaction with such image data, as described herein.

Numerous other general purpose or special purpose computing system environments or configurations may be used. Examples of well-known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

Figure 16:
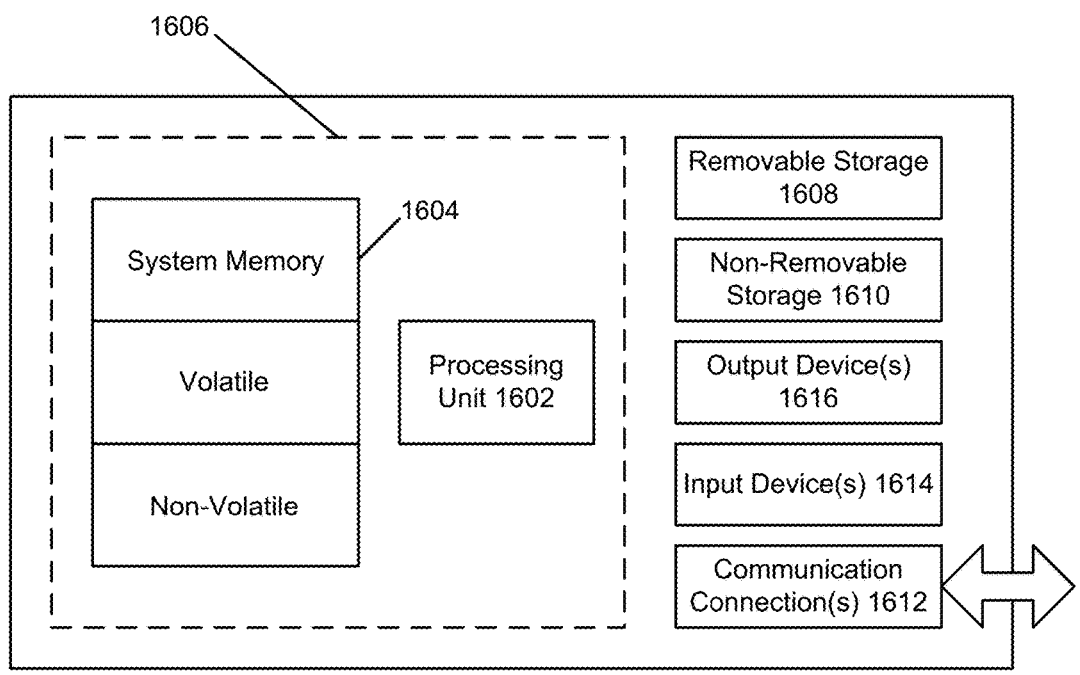
FIG. 16 shows an exemplary computing environment in which example embodiments and aspects may be implemented.

FIG. 16 shows an exemplary computing environment in which example embodiments and aspects may be implemented. The computing system environment is only one example of a suitable computing environment and is not intended to suggest any limitation as to the scope of use or functionality.

With reference to FIG. 16, an exemplary system for implementing aspects described herein includes a device, such as device 1600. In its most basic configuration, device 1600 typically includes at least one processing unit 1602 and memory 1604. Depending on the exact configuration and type of device, memory 1604 may be volatile (such as random access memory (RAM)), non-volatile (such as read-only memory (ROM), flash memory, etc.), or some combination of the two. This most basic configuration is illustrated in FIG. 16 by dashed line 1606.

Device 1600 may have additional features/functionality. For example, device 1600 may include additional storage (removable and/or non-removable) including, but not limited to, magnetic or optical disks or tape. Such additional storage is illustrated in FIG. 16 by removable storage 1608 and non-removable storage 1610.

Device 1600 typically includes a variety of computer readable media. Computer readable media can be any available media that can be accessed by device 1600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1604, removable storage 1608, and non-removable storage 1610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 1600. Any such computer storage media may be part of device 1600.

Device 1600 may contain communications connection(s) 1612 that allow the device to communicate with other devices. Device 1600 may also have input device(s) 1614 such as a keyboard, mouse, pen, voice input device, touch input device, etc. Output device(s) 1616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
providing a measurement tool in a client-server architecture, the measurement tool for measuring a quantity associated with a displayed image and including a magnified view of the image;
rendering the image and the magnified view at the server;
communicating the image and the magnified view to the client computing device;
displaying the image and the magnified view on a client display;
detecting a touch input on the client display;
communicating, in response to the touch input, metadata from the server to the client computing device that contains information about the quantity; and
rendering a dynamically updated display of the quantity at the client computing device using updated metadata received from the server via a data transfer loop between the client computing device and the server, wherein the data transfer loop provides the server with dynamic position information regarding the touch input on the client display and returns respectively updated meta data to the client computing device until the loop terminates upon detecting a removal of the touch input.

2. The method of claim 1, further comprising communicating information about the quantity in a state model that is communicated between the client computing device and the server.

3. The method of claim 2, further comprising communicating position information associated with a user touch at the computing device in the state model.

4. The method of claim 1, further comprising rendering a geometric identifier associated with the quantity at the server.

5. The method of claim 4, wherein the geometric identifier comprises one of a line segment, an oval, a square or a rectangle.

6. The method of claim 4, further comprising providing the dynamically updated display as a numeric measurement associated with the geometric identifier.

7. The method of claim 1, wherein the dynamically updated display of the quantity is displayed proximate to the magnified view.

8. The method of claim 7, wherein dynamically updated display of the quantity is a numeric measurement.

9. The method of claim 1 wherein detecting the touch input on the client display comprises identifying the touch input as a start position for measuring the quantity.

10. The method of claim 9, further comprising setting an initial position of the touch input as the start position after the touch input is associated with the initial position for a predetermined period.

11. The method of claim 9 further comprising providing a visual indication that the start position has been set.

* * * * *